US011110976B2

(12) United States Patent
Fischer et al.

(10) Patent No.: US 11,110,976 B2
(45) Date of Patent: Sep. 7, 2021

(54) SPARE TIRE COVERS AND ACCESSORIES

(71) Applicants: Christopher Fischer, Boulder, CO (US); Jessica Fischer, Boulder, CO (US)

(72) Inventors: Christopher Fischer, Boulder, CO (US); Jessica Fischer, Boulder, CO (US)

(73) Assignee: Boomerang Enterprises, Inc., Longmont, CO (US)

( * ) Notice: Subject to any disclaimer, the term of this patent is extended or adjusted under 35 U.S.C. 154(b) by 0 days.

(21) Appl. No.: 16/453,676

(22) Filed: Jun. 26, 2019

(65) Prior Publication Data

US 2021/0016846 A1 Jan. 21, 2021

Related U.S. Application Data

(60) Provisional application No. 62/690,558, filed on Jun. 27, 2018.

(51) Int. Cl.
| | |
|---|---|
| *B62D 43/00* | (2006.01) |
| *B60R 1/00* | (2006.01) |
| *B62D 43/02* | (2006.01) |
| *B60R 11/04* | (2006.01) |

(52) U.S. Cl.
CPC ............ *B62D 43/005* (2013.01); *B60R 1/002* (2013.01); *B62D 43/02* (2013.01); *B60R 11/04* (2013.01); *B60R 2300/60* (2013.01)

(58) Field of Classification Search
CPC ..... B62D 43/005; B62D 43/02; B62D 43/007
USPC .................................... 206/304, 304.1–304.2
See application file for complete search history.

(56) References Cited

U.S. PATENT DOCUMENTS

| | | | | | |
|---|---|---|---|---|---|
| 5,676,288 | A | * | 10/1997 | Spirk | ........................ B62J 19/00 150/167 |
| 5,876,328 | A | * | 3/1999 | Fox | ......................... A61B 46/10 600/121 |
| 5,996,863 | A | * | 12/1999 | Burke | ................... G09F 21/045 150/166 |
| 2006/0162406 | A1 | * | 7/2006 | Chen | .................... B62D 43/007 70/225 |

(Continued)

OTHER PUBLICATIONS

Quadratec YouTube Video, 3 Screen Captures, Feb. 7, 2018 (Year: 2018).*

(Continued)

*Primary Examiner* — Scott T McNurlen
(74) *Attorney, Agent, or Firm* — Santangelo Law Offices, P.C.

(57) ABSTRACT

A system of coverings for a rear mounted spare tire having a central backup camera such as the Jeep® is provided. The coverings including a hard cover with either a hard rim mount or a sewn on soft rim mount. The soft rim mount can have locking loops for a hidden cable lock. A multi-tiered face is both decorative and designed to protect the camera with a rubber framed window and built in awning. A soft cover option provides a two piece camera shield that is mounted into. The center of the soft cover with screws or the like. The front hood of the camera shield has an awning for the camera that does not obfuscate the view of the camera. Optional ornaments or brake lights can also be mounted onto the camera shield. The camera shield can be used without a tire cover for protection and mounting the ornament or light.

14 Claims, 21 Drawing Sheets

(56) References Cited

U.S. PATENT DOCUMENTS

| | | | |
|---|---|---|---|
| 2008/0047985 A1* | 2/2008 | Newbill | B62D 43/02 |
| | | | 224/42.2 |
| 2010/0264187 A1* | 10/2010 | Buskirk | B62D 43/02 |
| | | | 224/502 |
| 2017/0106720 A1* | 4/2017 | Gress | B60H 1/00328 |

OTHER PUBLICATIONS

Jeep Spare Tire Cover Installation Instructions, Mar. 30, 2018 (Year: 2018).*
Jeep Mopar, Part No. 82215434 https://www.youtube.com/watch?v=oOIVLDdJF6Y.

* cited by examiner

SPARE TIRE COVERS AND ACCESSORIES

CROSS REFERENCE APPLICATION

This non-provisional application claims priority from provisional application No. 62/690,558 filed Jun. 27, 2018 which is incorporated herein by reference in its entirety.

FIELD OF THE INVENTION

The present invention relates to protective covers for rear mounted spare tires having a centrally mounted backup camera.

BACKGROUND

Jeep® makes a prior art soft cover for a rear mounted spare tire having a centrally mounted backup camera. The soft cover has a central hole with a sewn in one piece plastic sleeve to go over the camera. A pull cord must be grabbed by the user under the soft cover to release a pin that snaps into a hole in the camera housing. No provision is made to secure decorative signage to the Jeep® one piece sleeve to decorate the large central area of the cover of the spare tire.

U.S. Pat. No. 9,227,678 (2016) to Bolton discloses a Jeep® rear tire cover made of solid plastic or metal and includes a key lock to prevent access to the tire bolts. No provision for a central backup camera is disclosed.

What is needed in the art is a protective (plastic) sleeve that goes over the central mounted backup camera that is easily attached to a soft cover, that can hold a sign, and that can be used alone, without a cover, to mount a decorative sign on. A hard cover is also needed with a central awning for the camera that does not interfere with the field of view of the camera. The present invention encompasses all these needs and more.

SUMMARY OF THE INVENTION

The main aspect of the present invention is to provide a two piece camera shield that can function as an anchor for a soft cover and a sign or light holder, and be used without any cover on a rear mounted spare tire.

Another aspect of the present invention is to provide a hard cover for the rear mounted spare tire with either a hard rim anchor or a soft sewn on peripheral anchor. The hard cover having a sloped center section with a soft camera window that does not reduce the camera field of vision.

Another aspect of the present invention is to provide a key lock on the hard cover with the hard circular anchor embodiment.

Another aspect of the present invention is to provide a strap and cable lock on a hard cover to lock the cover to the tire.

Other aspects of this invention will appear from the following description and appended claims, reference being made to the accompanying drawings forming a part of this specification wherein like reference characters designate corresponding parts in the several views.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 8:
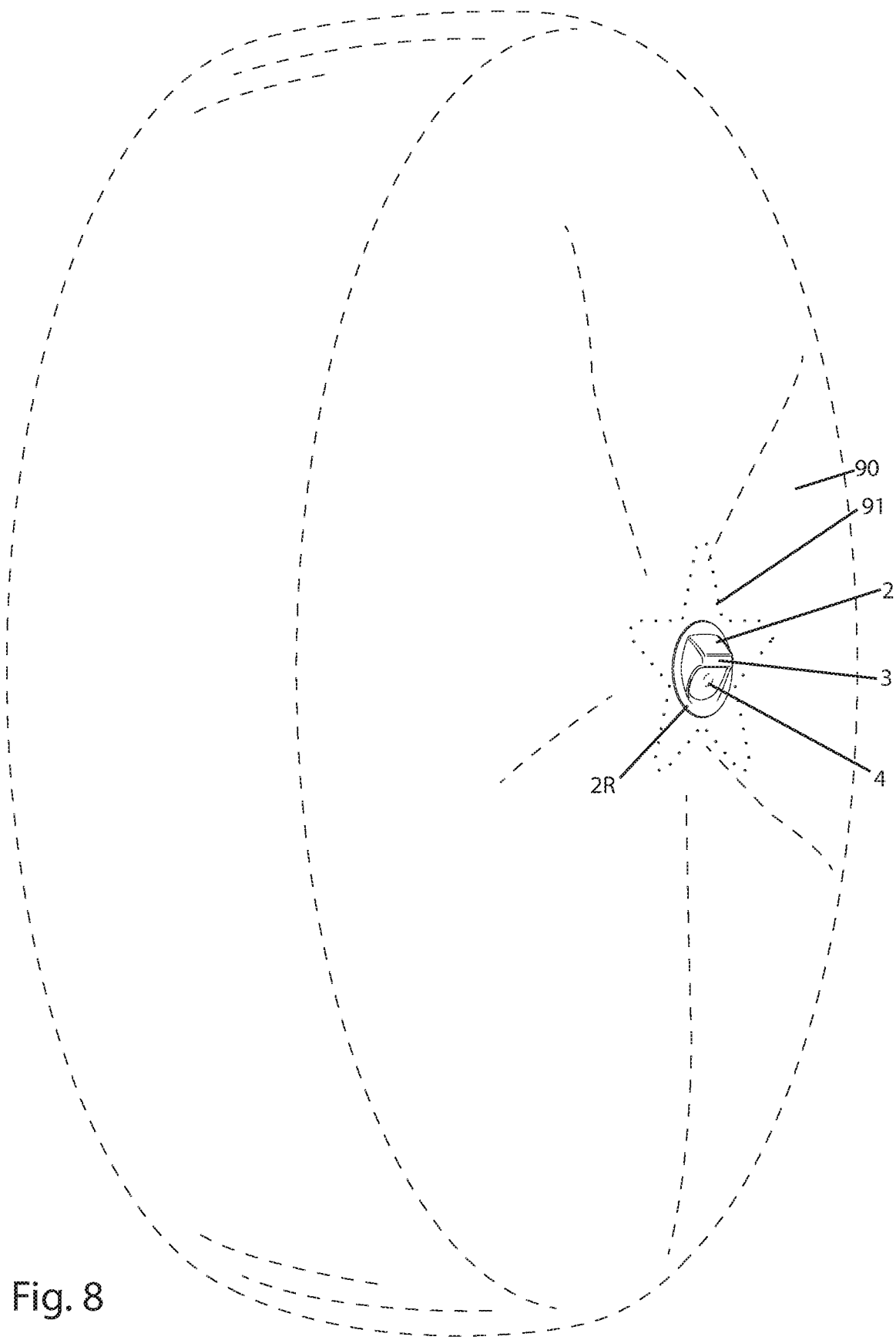
FIG. 8 is a front perspective view of the camera shield mounted to a soft tire cover and supporting a star shaped decoration.
Figure 9:
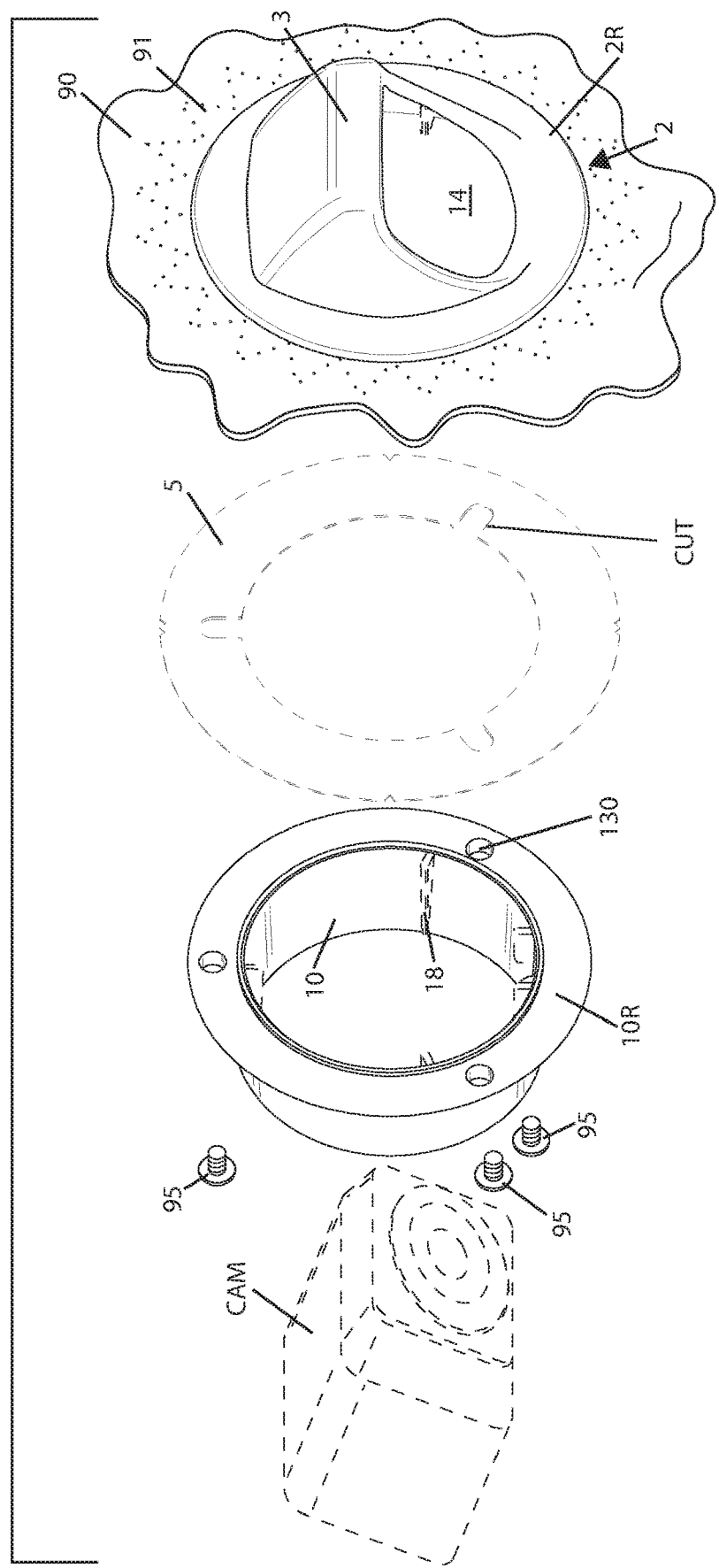
FIG. 9 is an exploded view of the FIG. 8 embodiment.
Figure 22:
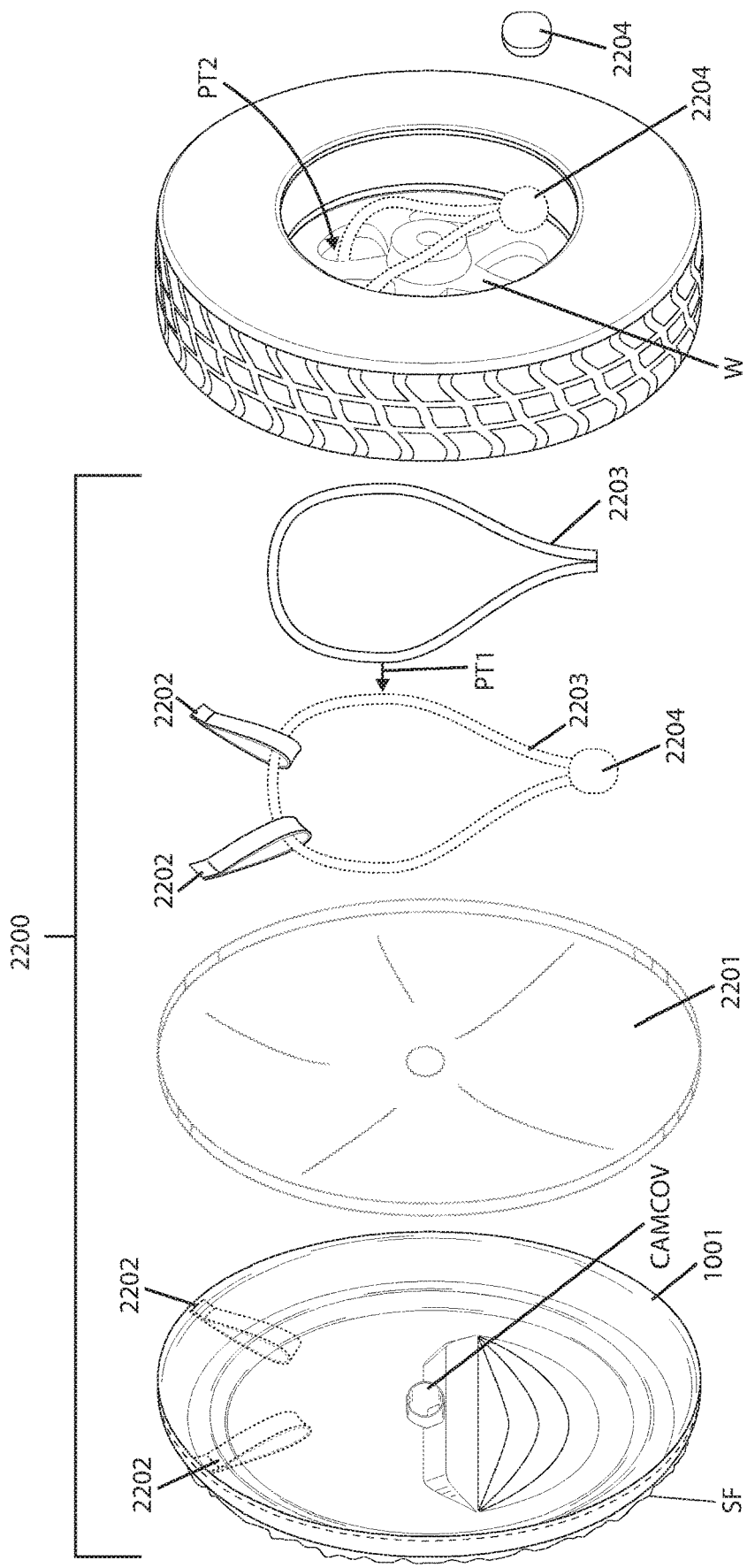
FIG. 22 is an exploded view of a hard cover with locking straps.

Referring first to FIGS. 1-10 a camera shield 1 has a front hood 2 that has an awning 3 to protect the camera 4. A gasket 5 can be installed behind a soft tire cover 90, thus forming a gap G between the gasket 5 rear surface RS of the rim 2R of the front hood 2. See FIGS. 8,9. FIGS. 8,9 also show an ornament 91 mounted under the rear surface RS of the rim 2R. FIG. 22 shows the infinite styles of ornaments and/or lights that can be an ornament 91 shown in FIG. 8.

A (plastic) base 10 mounts to the front hood 2 with screws 95 shown in FIG. 9. The base 10 has bosses 11 with holes 130 through the rim 10R of the base 10. The camera window is labeled 14. The base 10 is cylindrical and sized to fit around the prior art camera. The bottom of the base 10 may have a slot SL in which is mounted a (plastic) spring 15 that is part of rim 10R with a union 16. A knob 17 can snap into a hole in the prior art camera. Plastic mold reinforcements 18 are optional.

Figure 1:
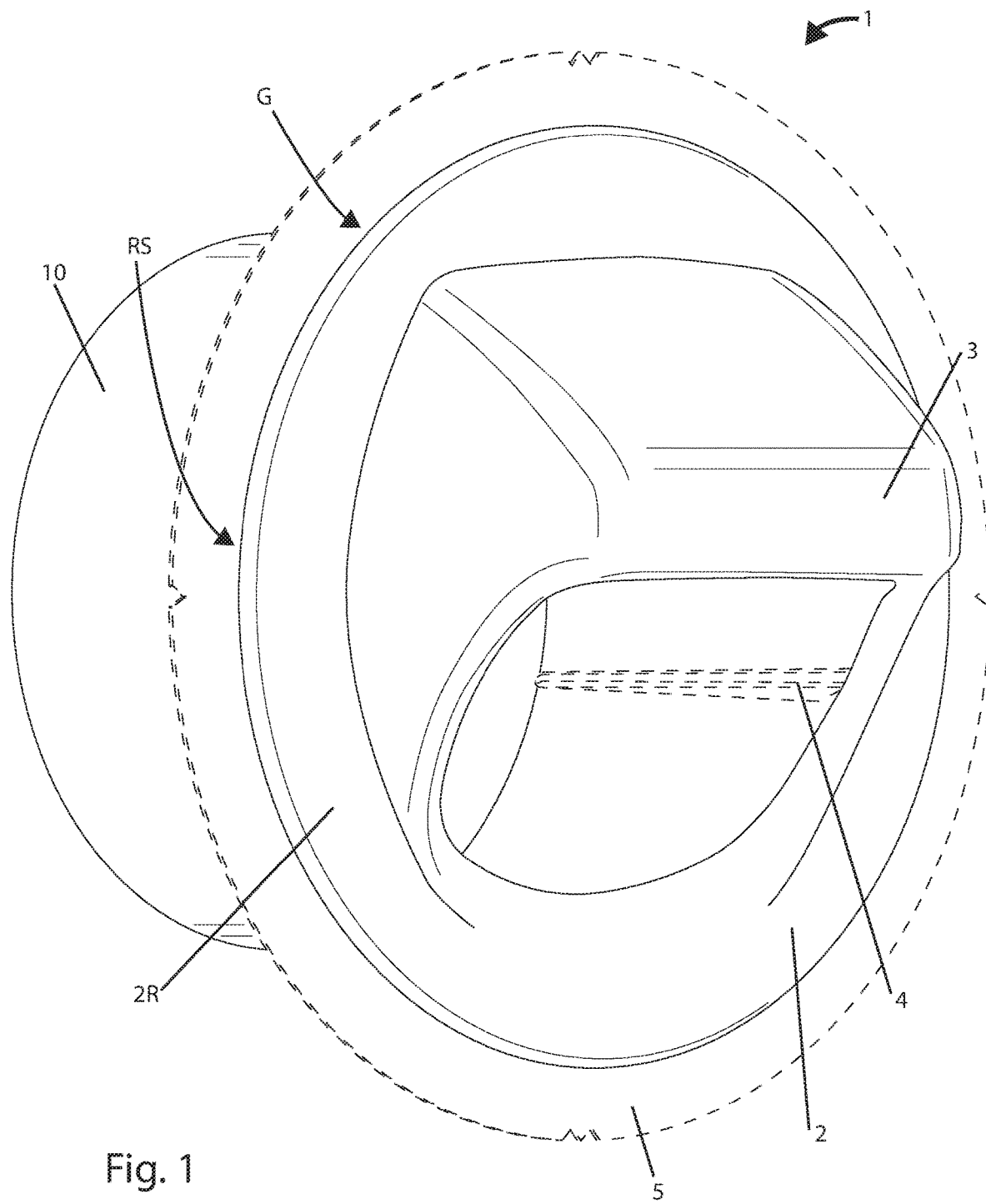
FIG. 1 is a front perspective view of the camera shield.
Figure 2:
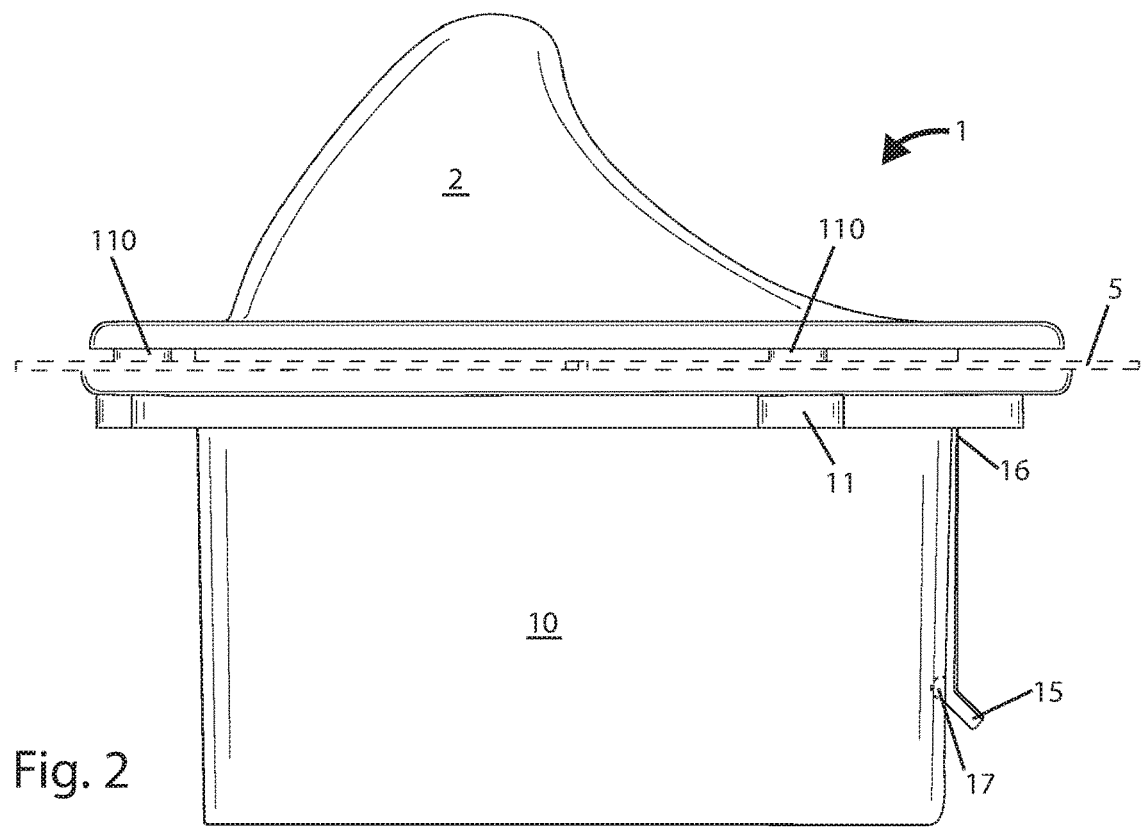
FIG. 2 is a left side elevation view of the camera shield.
Figure 3:
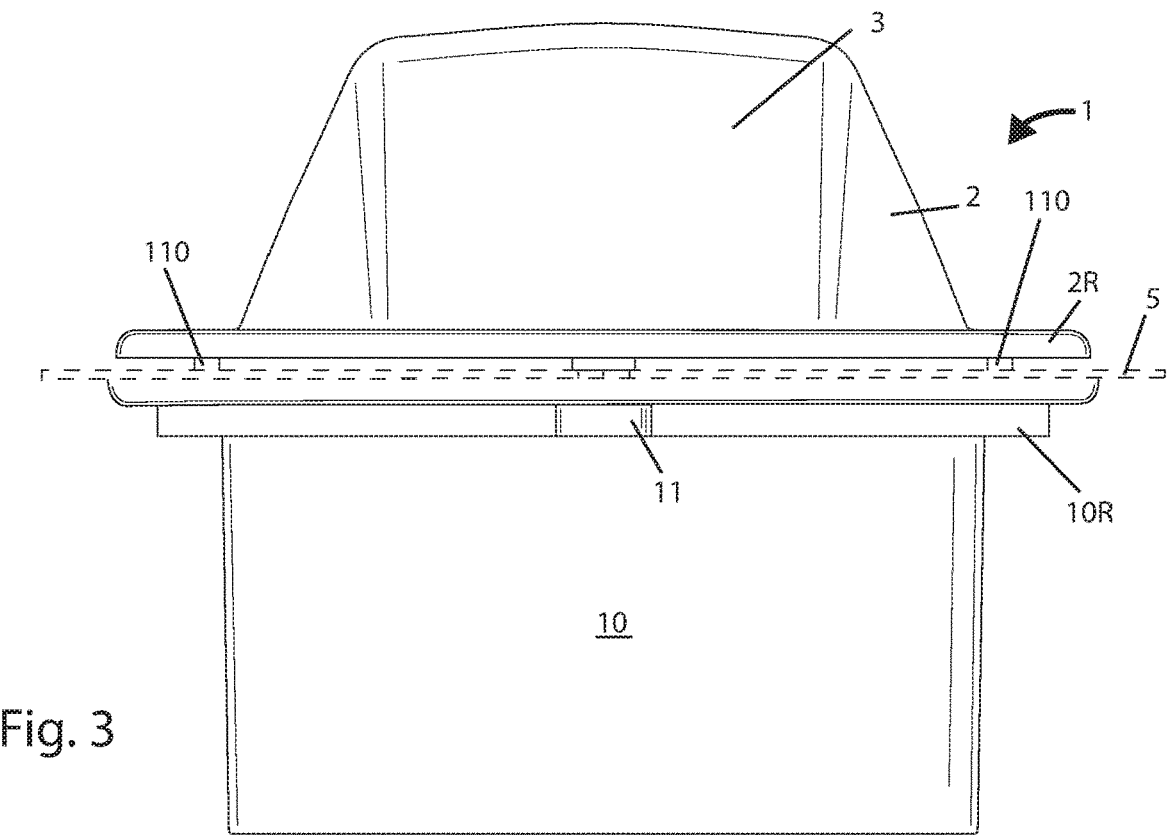
FIG. 3 is a bottom plan view of the camera shield.
Figure 4:
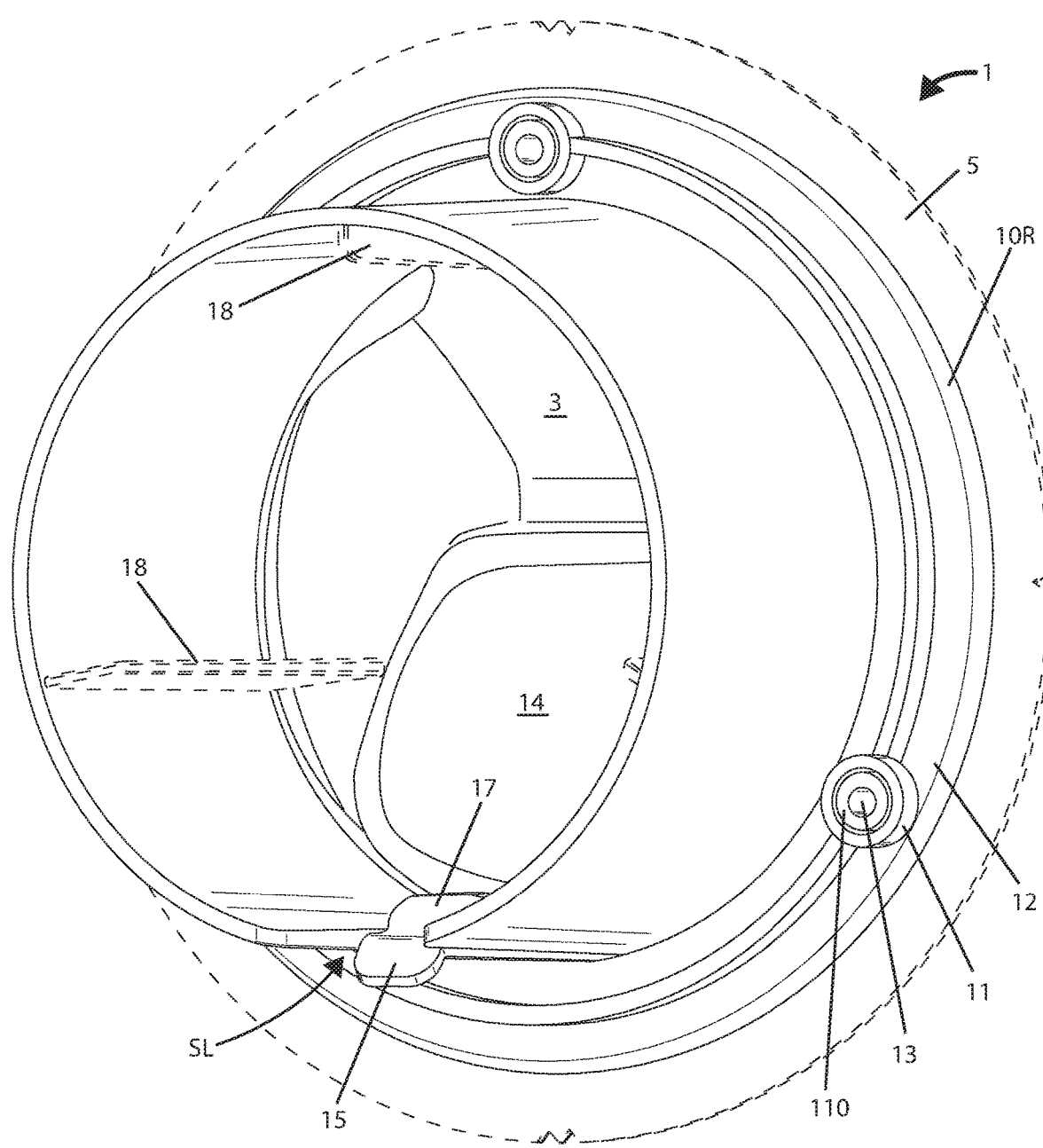
FIG. 4 is a rear perspective view of the camera shield.
Figure 5:
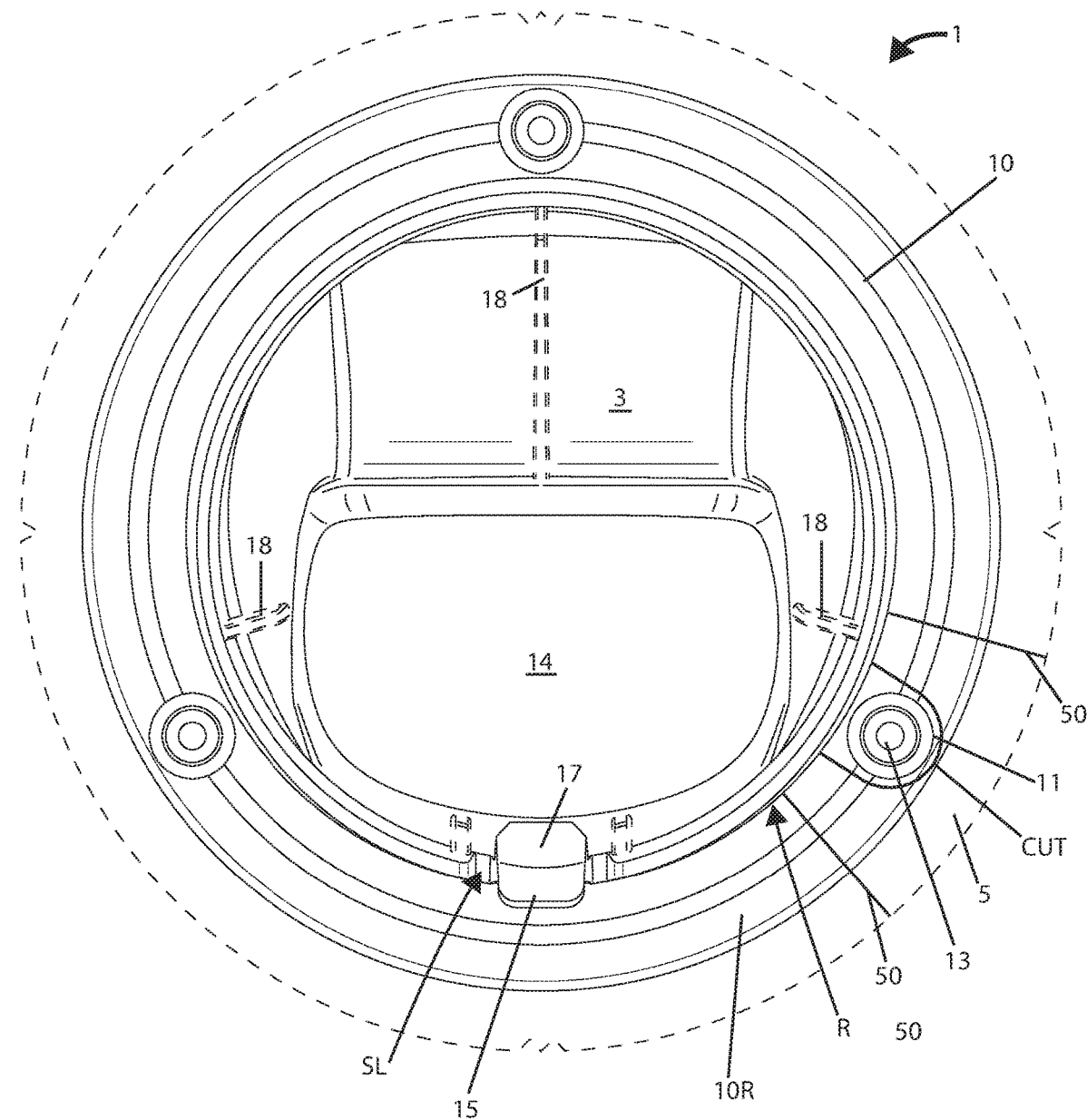
FIG. 5 is a rear elevation view of the camera shield.
Figure 6:
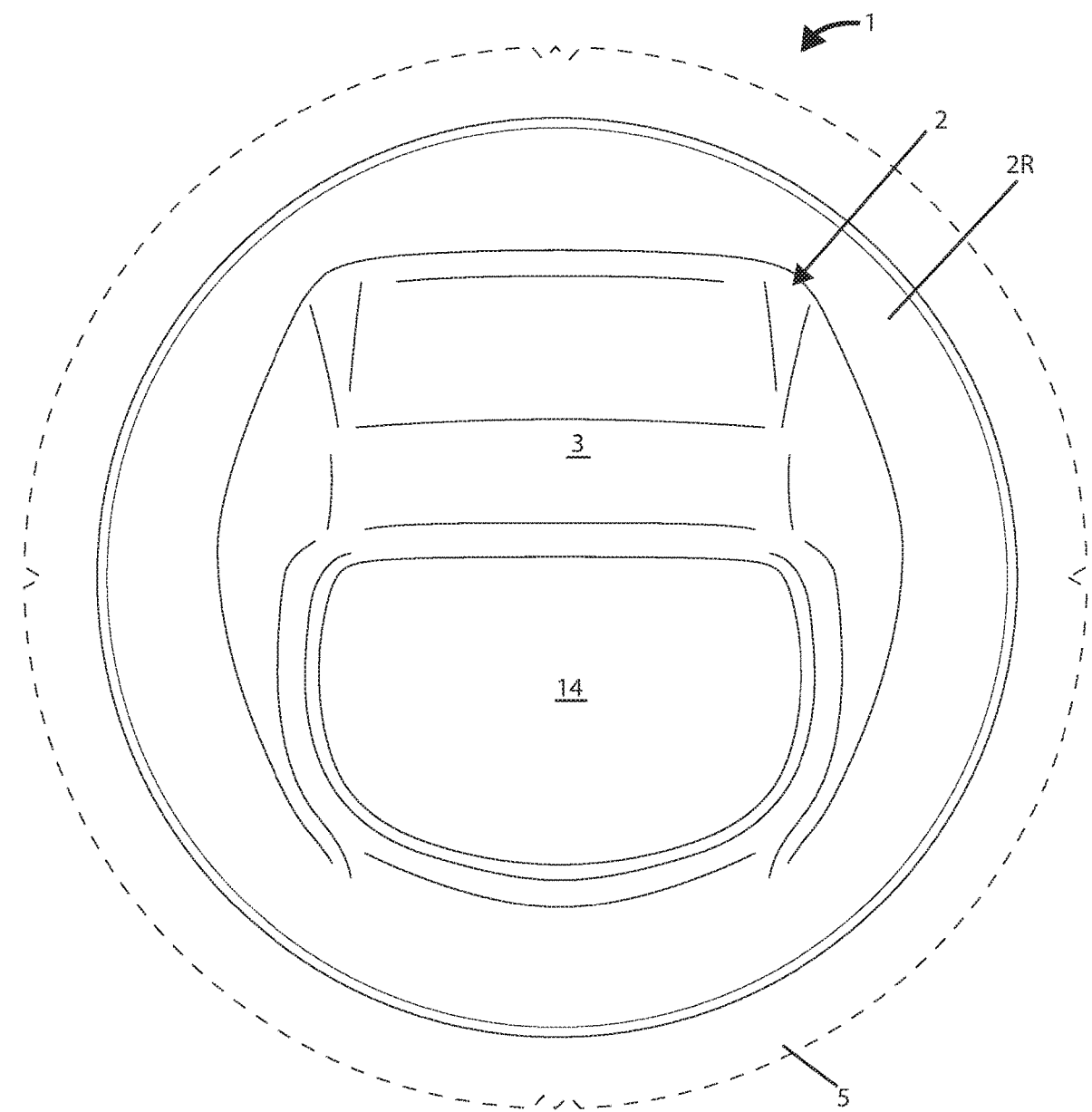
FIG. 6 is a front elevation view of the camera shield.
Figure 7:
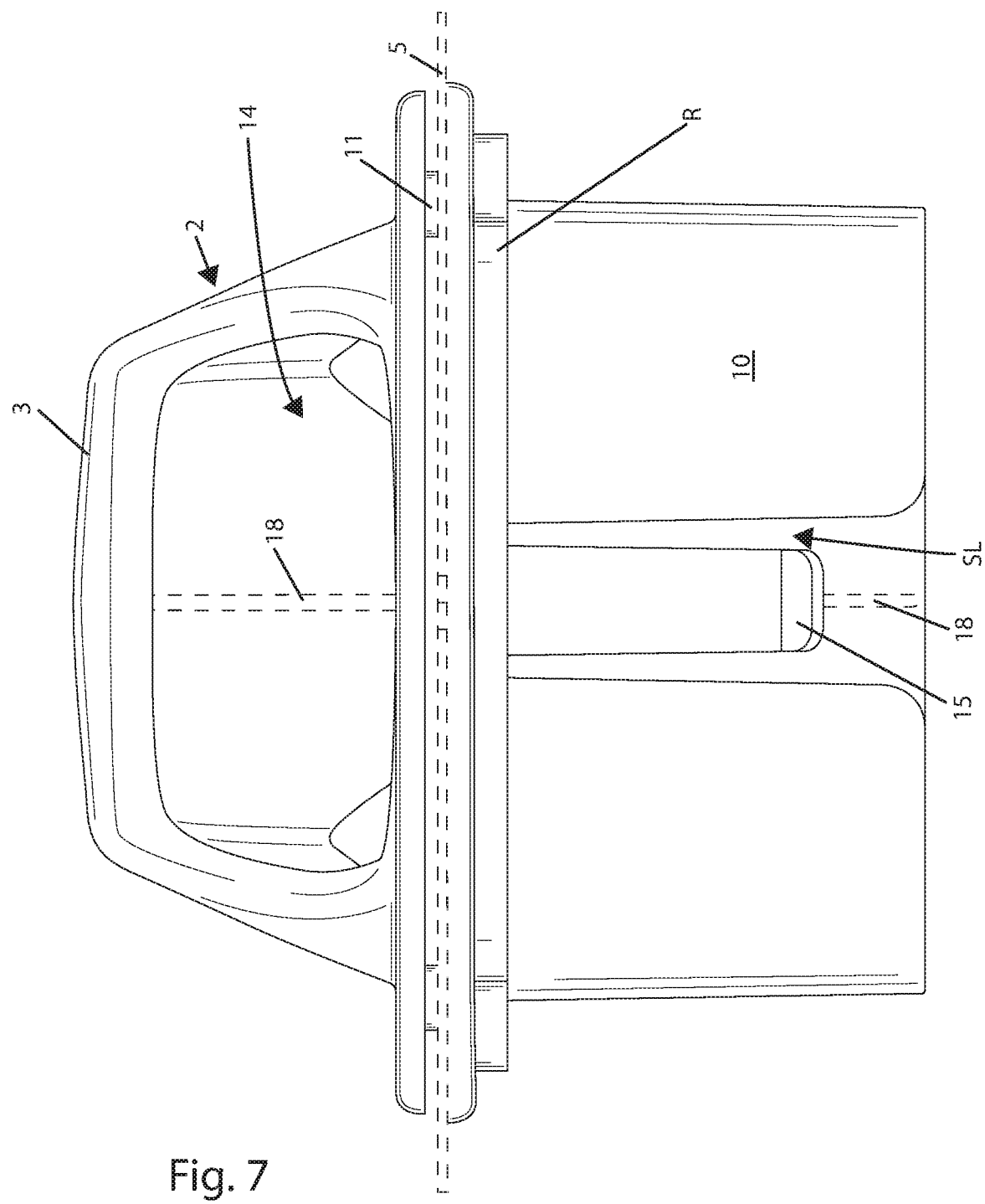
FIG. 7 is a bottom plan view of the camera shield.

As shown in FIG. 5 the gasket 5 may extend to a circular ridge R as shown by lines 50, and have cutouts cut to accommodate the bosses 11. The hood 2 has (plastic) cylindrical posts 110, shown in FIGS. 2,3,4 that fit into the bosses 11, holes 130 and receive a screw 9. Posts 110 may have self-threading screw holes. The camera in FIG. 9 is labeled CAM.

Figure 10:
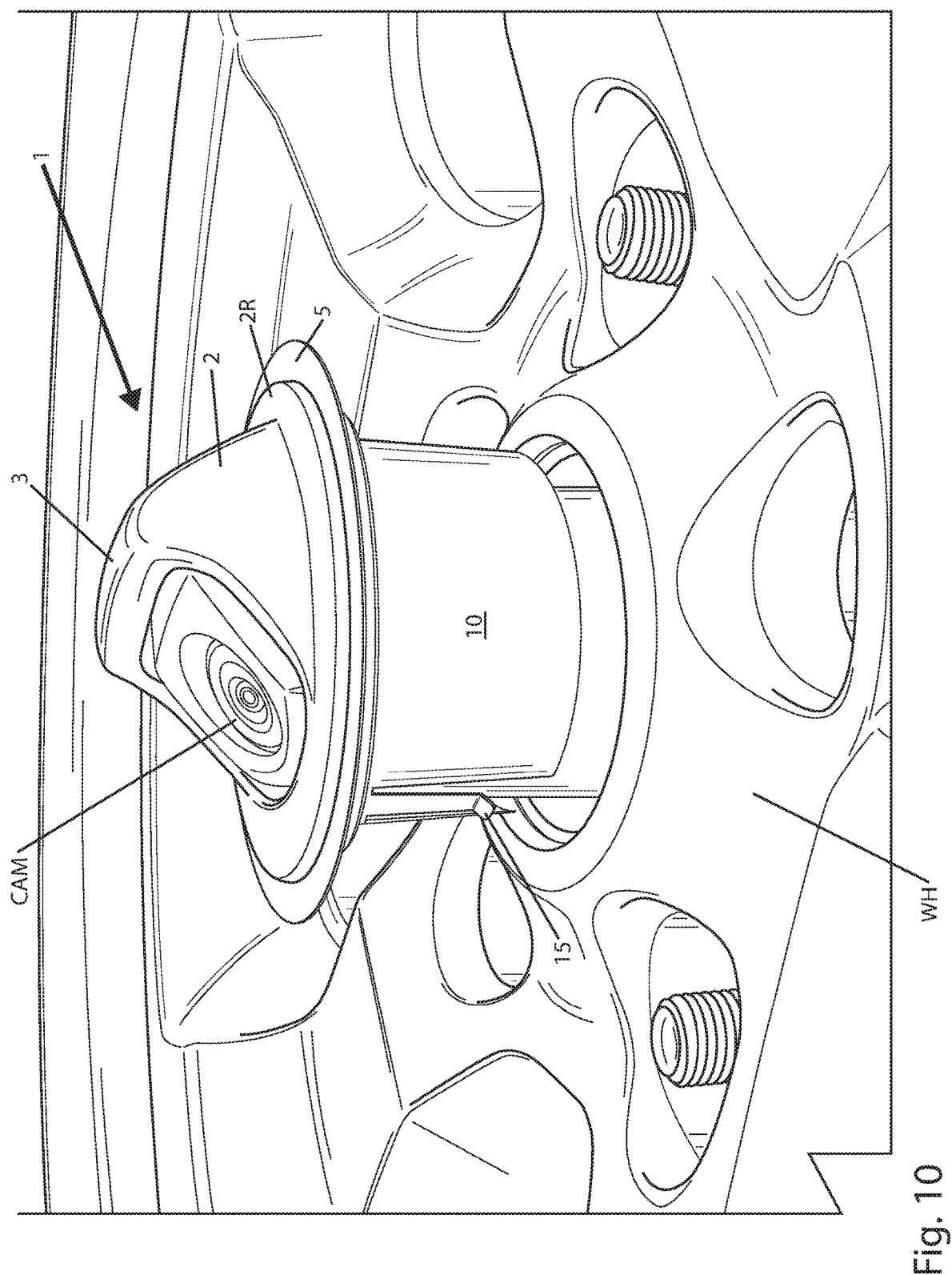
FIG. 10 is a side perspective view of the camera shield mounted on a camera.
Figure 11:
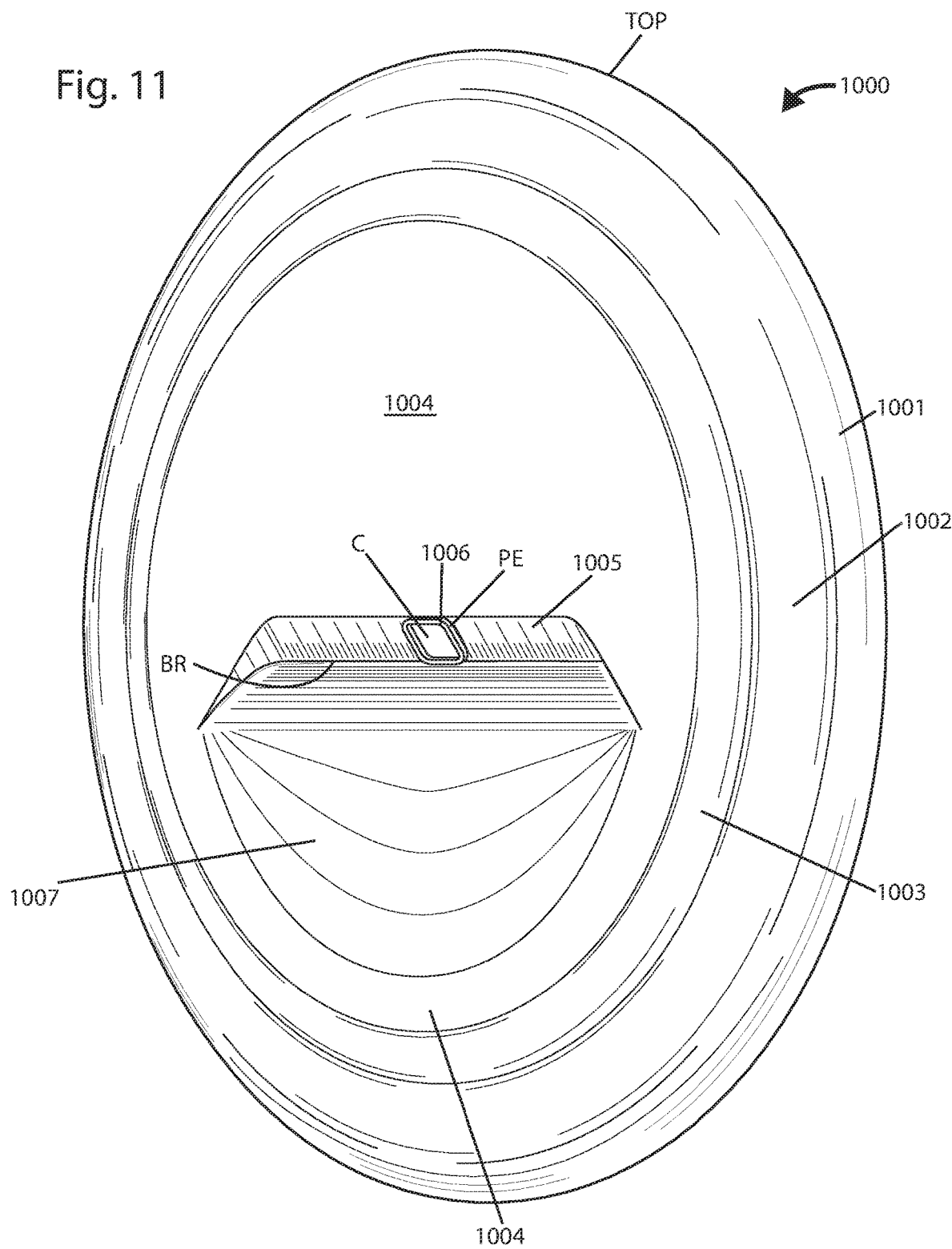
FIG. 11 is a front perspective view of a hard tire cover for a rear spare.

The camera shield 1 has several functions. First as shown in FIG. 10 it can just slip onto the camera CAM as a protector, wherein the camera CAM does project outwards from the wheel WH.

Second an ornament including a brake light 910 or a star 91 can be mounted between the base 10 and the hood 2. Third the soft cover 90 shown in FIGS. 8,9 has a hole for the camera CAM. The hood 2 can be installed on the outside of the soft cover 90, and the base 10 is screwed in from the rear of the soft cover 90.

Fourth, as shown in FIG. 8, an ornament 91 or a light 910 can be added to the soft cover installation.

Figure 23:
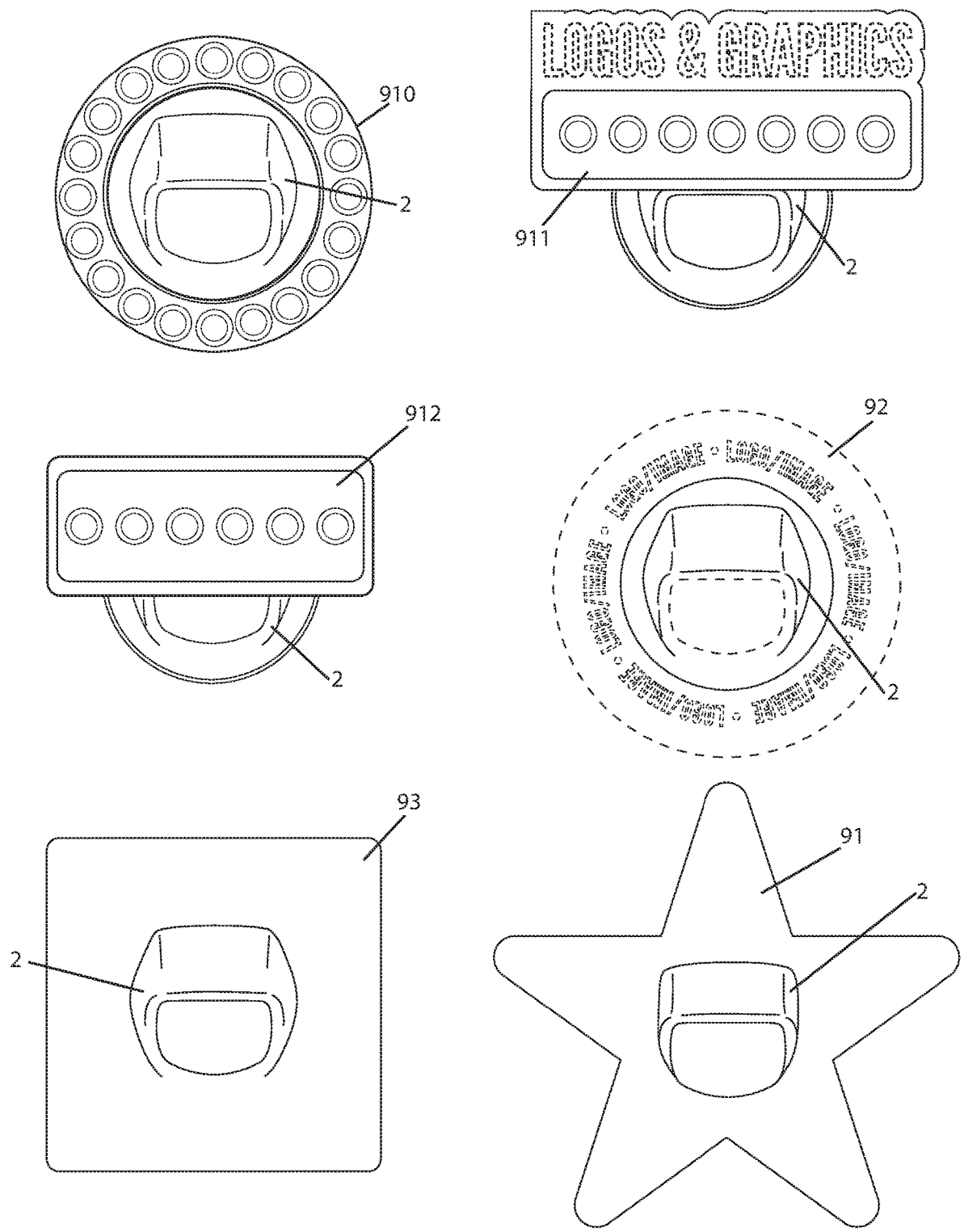
FIG. 23 is a top plan view of a variety of ornaments and lights that can mount on the camera shield of FIG. 1.

Referring next to FIG. 23 a variety of ornaments including a star 91 are shown. Each can be mounted to the camera shield 1. A brake light 910, 911,912 can also be mounted to the camera shield 1. Other decorations are shown as items 92,93.

Figure 18:
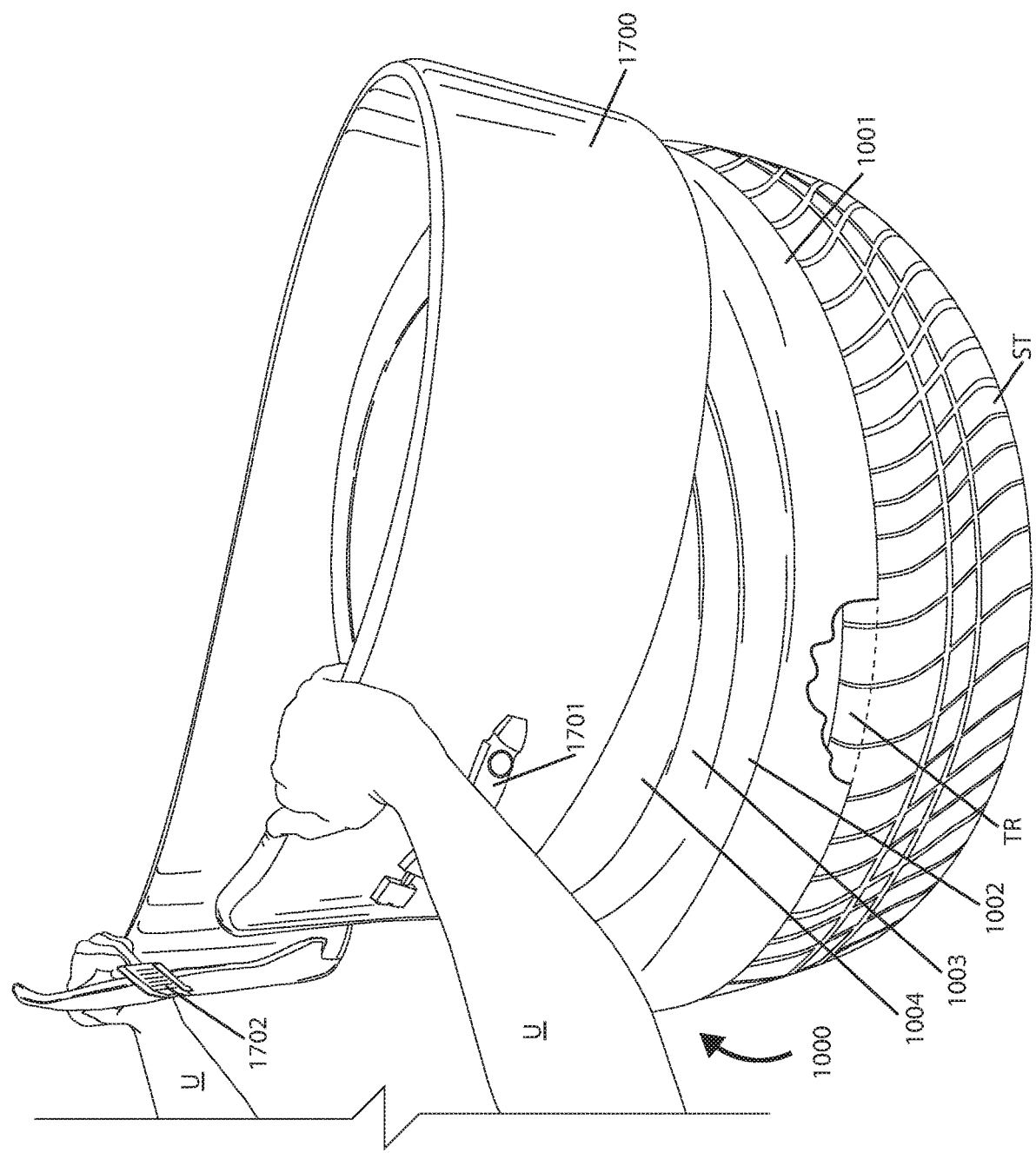
FIG. 18 is a front perspective view of an installation of a hard cover with a hard circular rim.

Referring next to FIGS. 11-22 a hard (plastic) cover 1000 is shown for rear mounted spare tires having a central backup camera such as Jeep®. A round peripheral lip 1001 is sized to fit around the spare tire ST and cover a portion of the outermost tread TR as shown in FIG. 18.

Working inward from the peripheral lip 1001 is a flat plateau 1002. Next inward is a rising transition 1003 slanting inward toward a center C. Next inward is a central flat plateau 1004. The top of the hard cover 1000 is labeled TOP.

Figure 12:
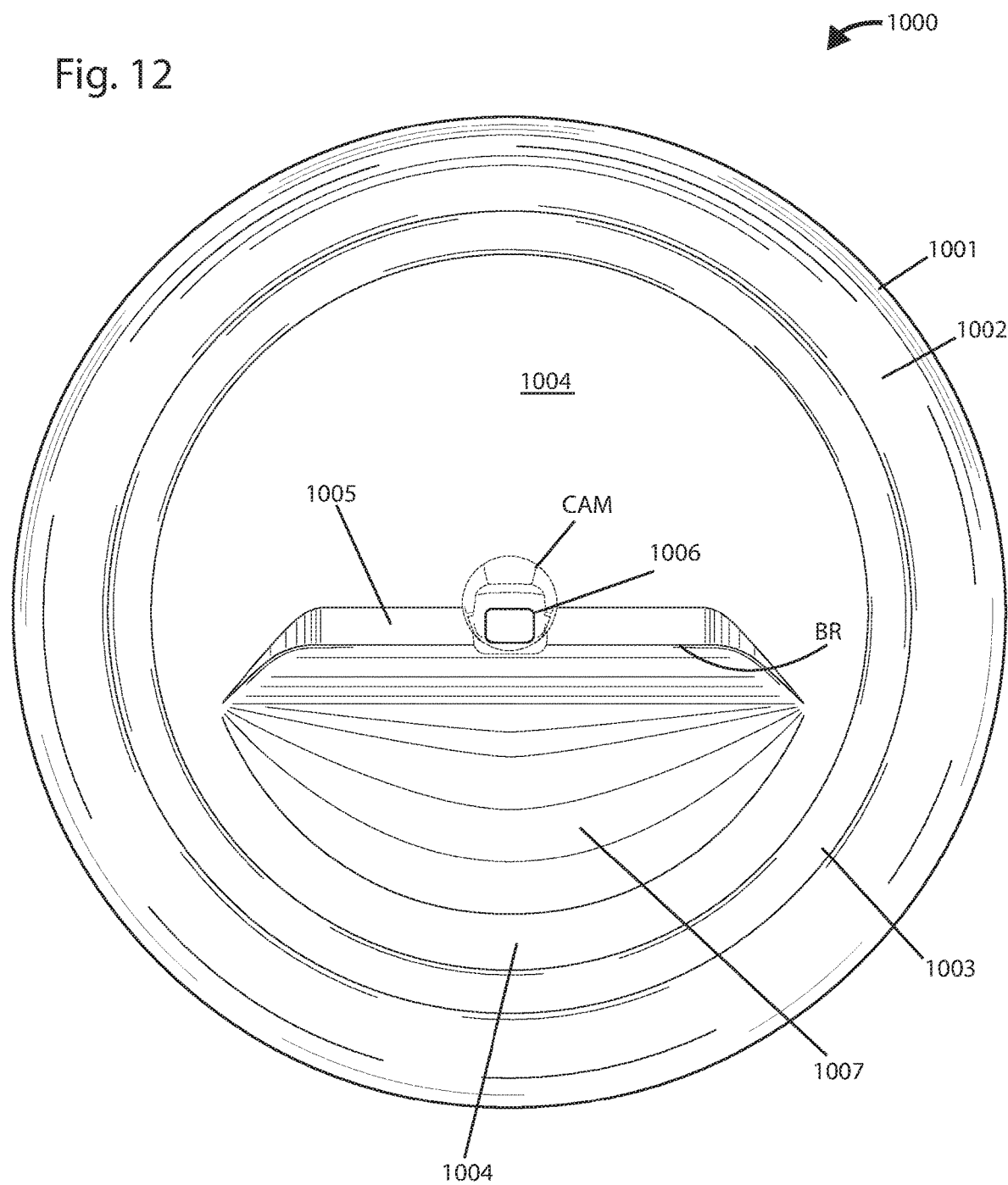
FIG. 12 is a rear elevation view of the FIG. 11 embodiment.
Figure 13:
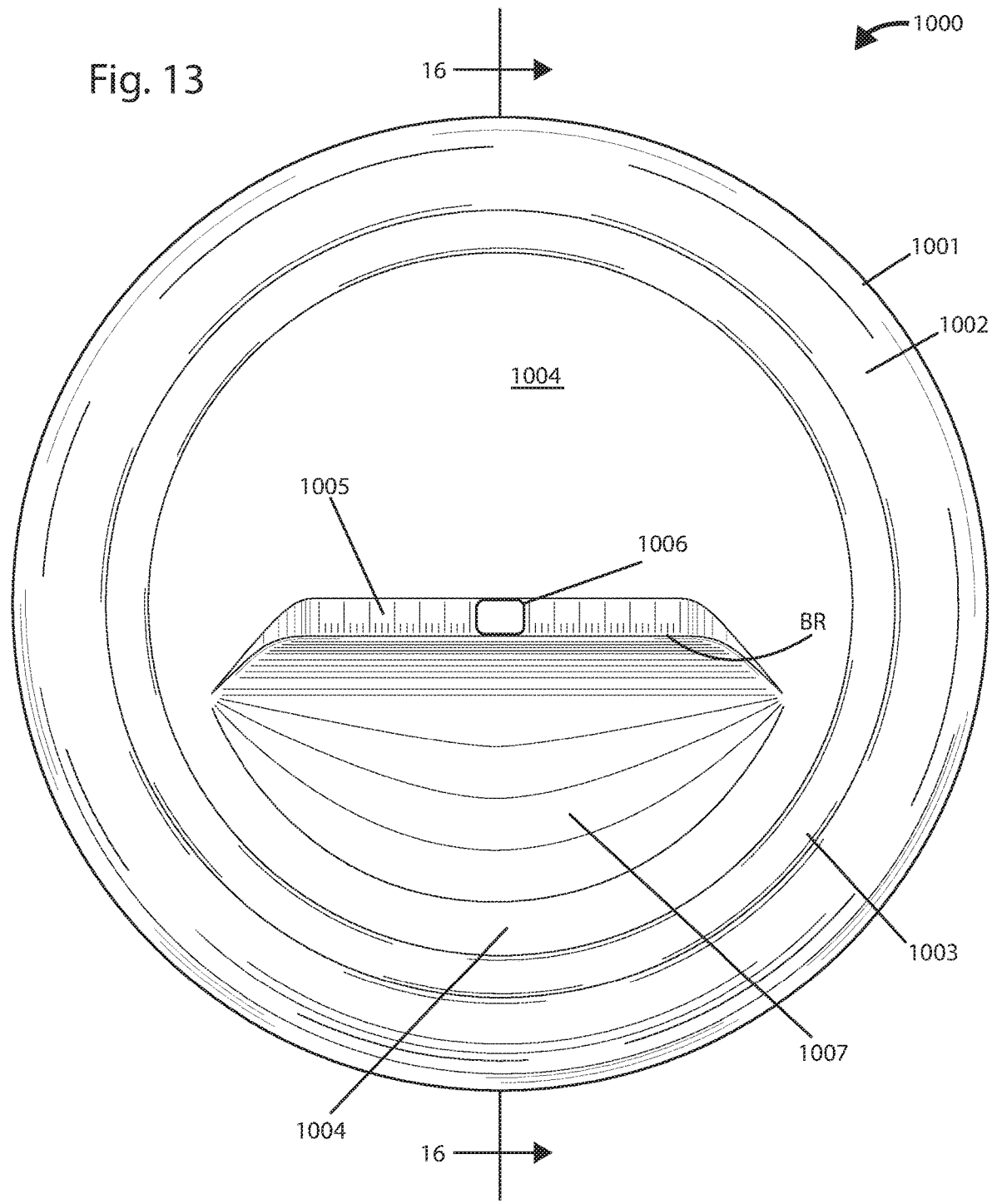
FIG. 13 is a front elevation view of the FIG. 11 embodiment.

Just above the center C the central flat plateau 1004 descends a ridge 1005 so as to place the camera window 1006 over the camera CAM as shown in FIG. 12 in dotted lines. Then from the bottom of the ridge 1005, labeled BR, sloping outbound in a semi-circular pattern is the transition slope 1007. The length of the bottom of the ridge BR is nominally about 20% to about 40% of the width of the hard cover 1000.

Figure 19:
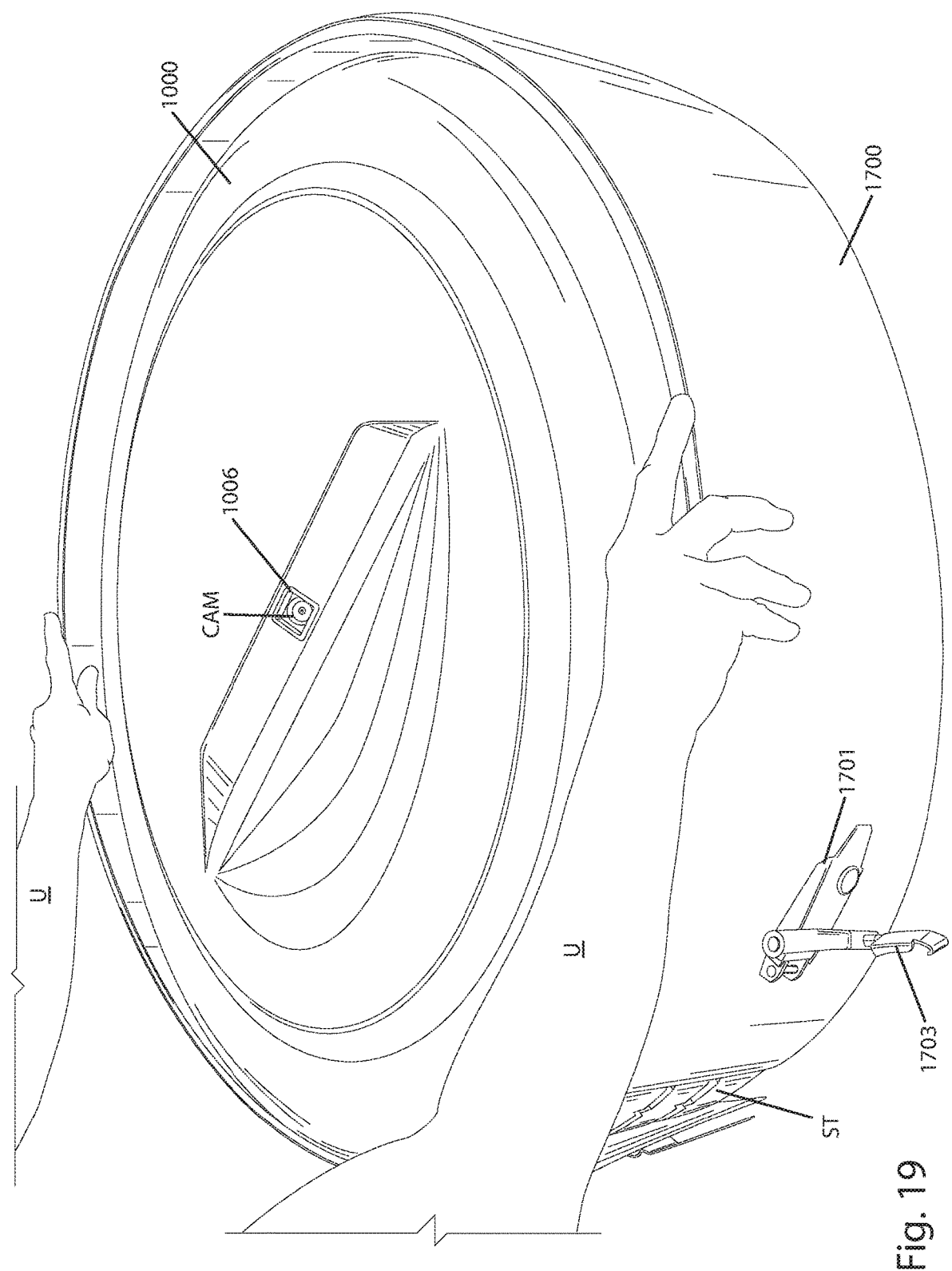
FIG. 19 is a front perspective view of the FIG. 18 installation showing the open clamp.

In FIGS. 18,19 the user's hands and arms are labeled U. The hard plastic rim 1700 is prior art as is the female latch 1701 and the male tongue 1702. The hook 1703 latches into a selected slot on the tongue 1702. The combination of the hard cover 1000 with the rim 1700 is a new combination. The latch assembly 1701, 1702, 1703 can be locked in a known manner to prevent removal of the hard cover 1000.

Figure 14:
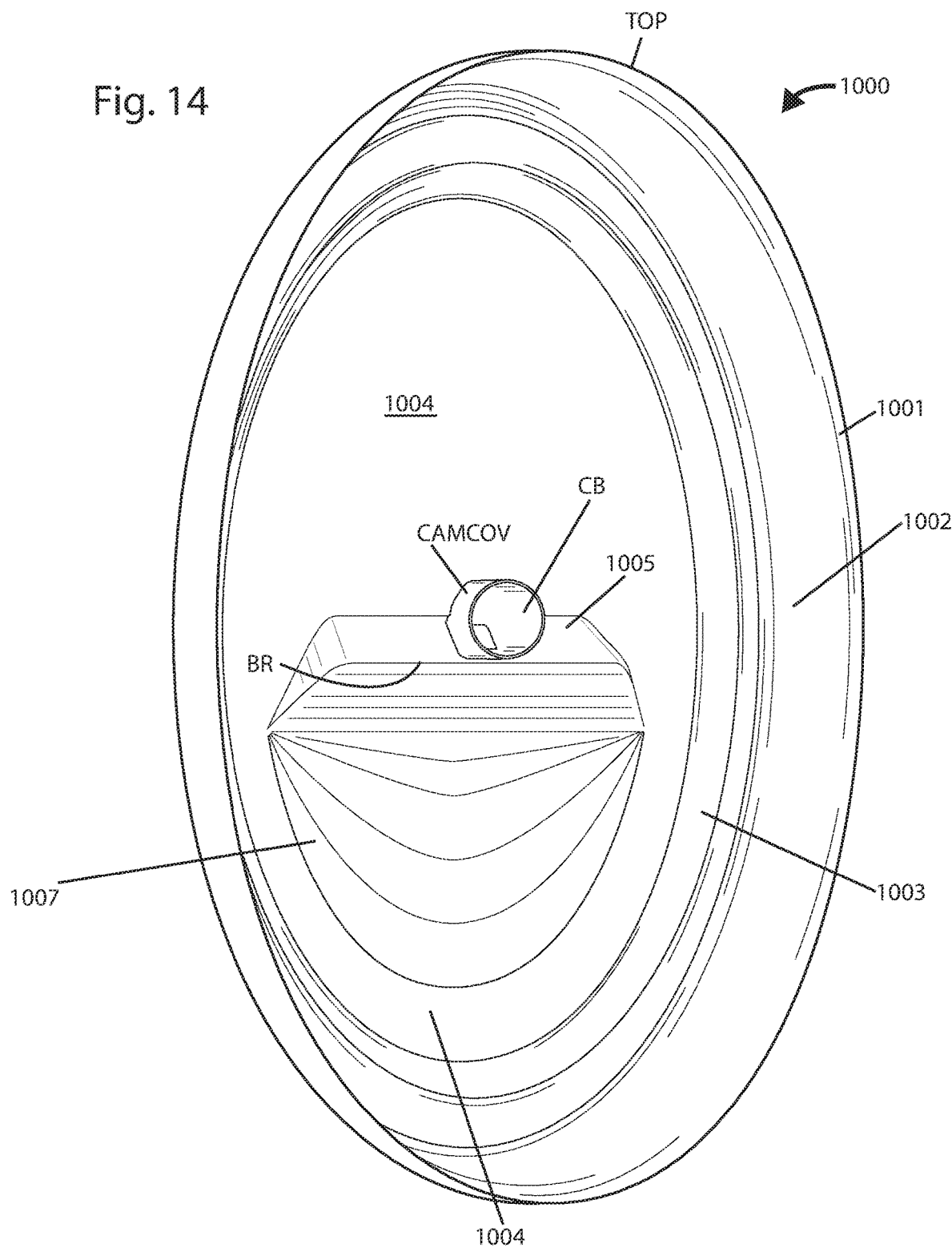
FIG. 14 is a rear perspective view of the FIG. 11 embodiment.
Figure 15:
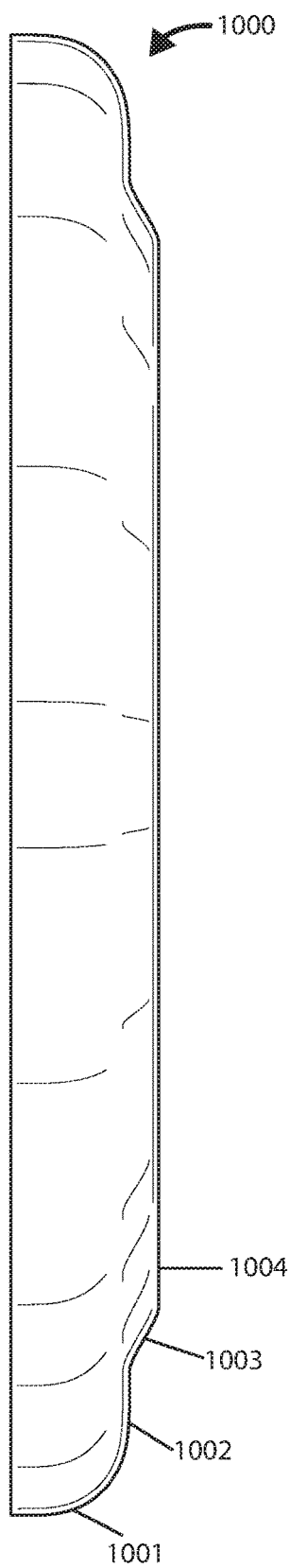
FIG. 15 is a right side elevation view of the FIG. 11 embodiment, a left side elevation view being a mirror image thereof.
Figure 16:
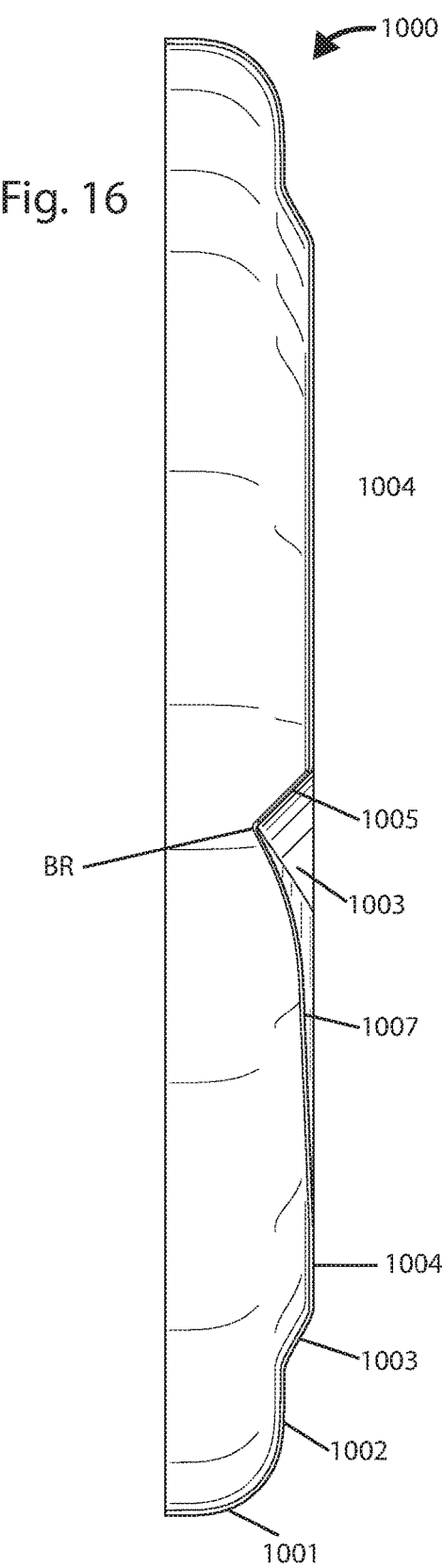
FIG. 16 is a cross sectional view taken along line 16-16 of FIG. 13.
Figure 17:
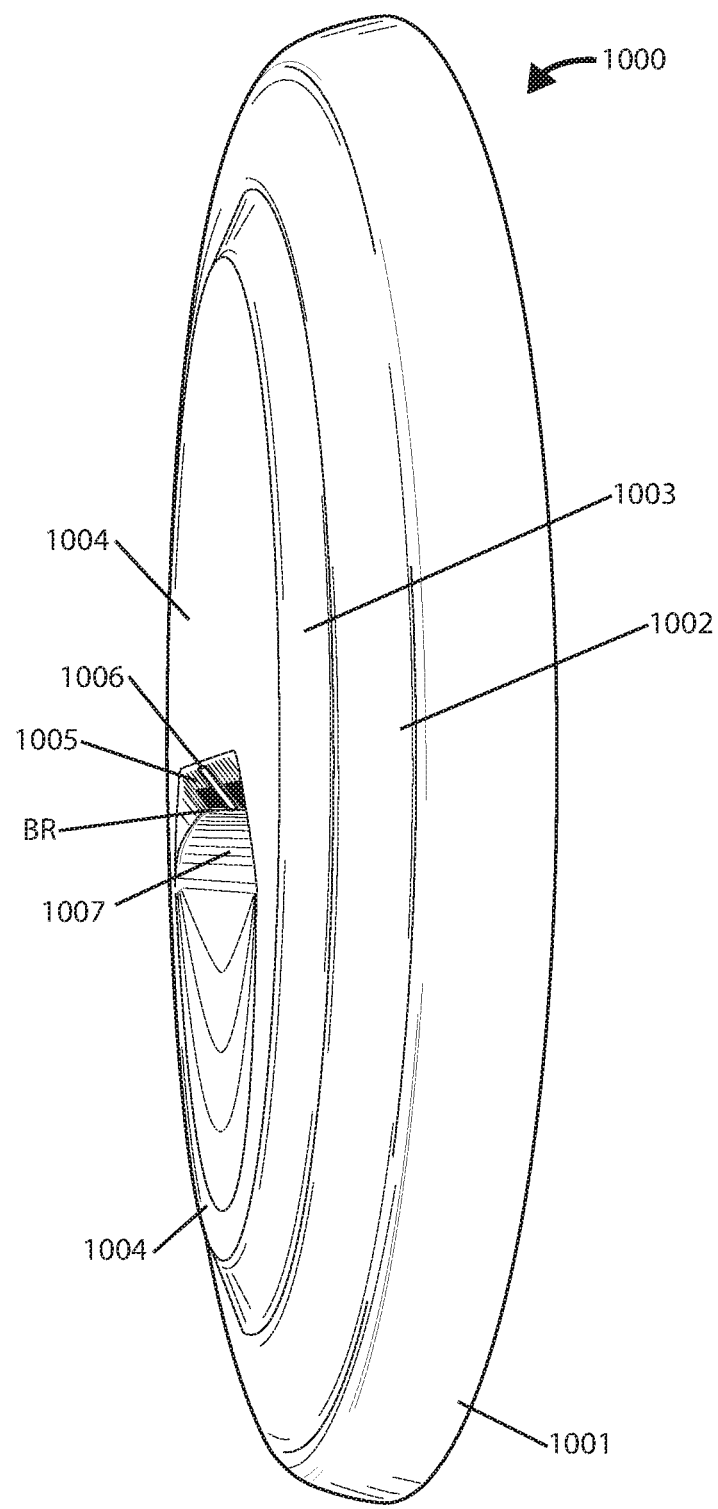
FIG. 17 is a right side perspective view of the FIG. 11 embodiment.

In FIG. 14 a (one piece molded rubber) camera cover CAMCOV can be seen. The camera cover has a peripheral edge PE that protrudes outside the camera window 1006. See FIG. 11. Under the peripheral edge PE is a groove which accommodates the hard plastic rectangular edges of the camera window 1006. Then a cylindrical body CB (a soft rubber) encircles the camera.

Figure 20:
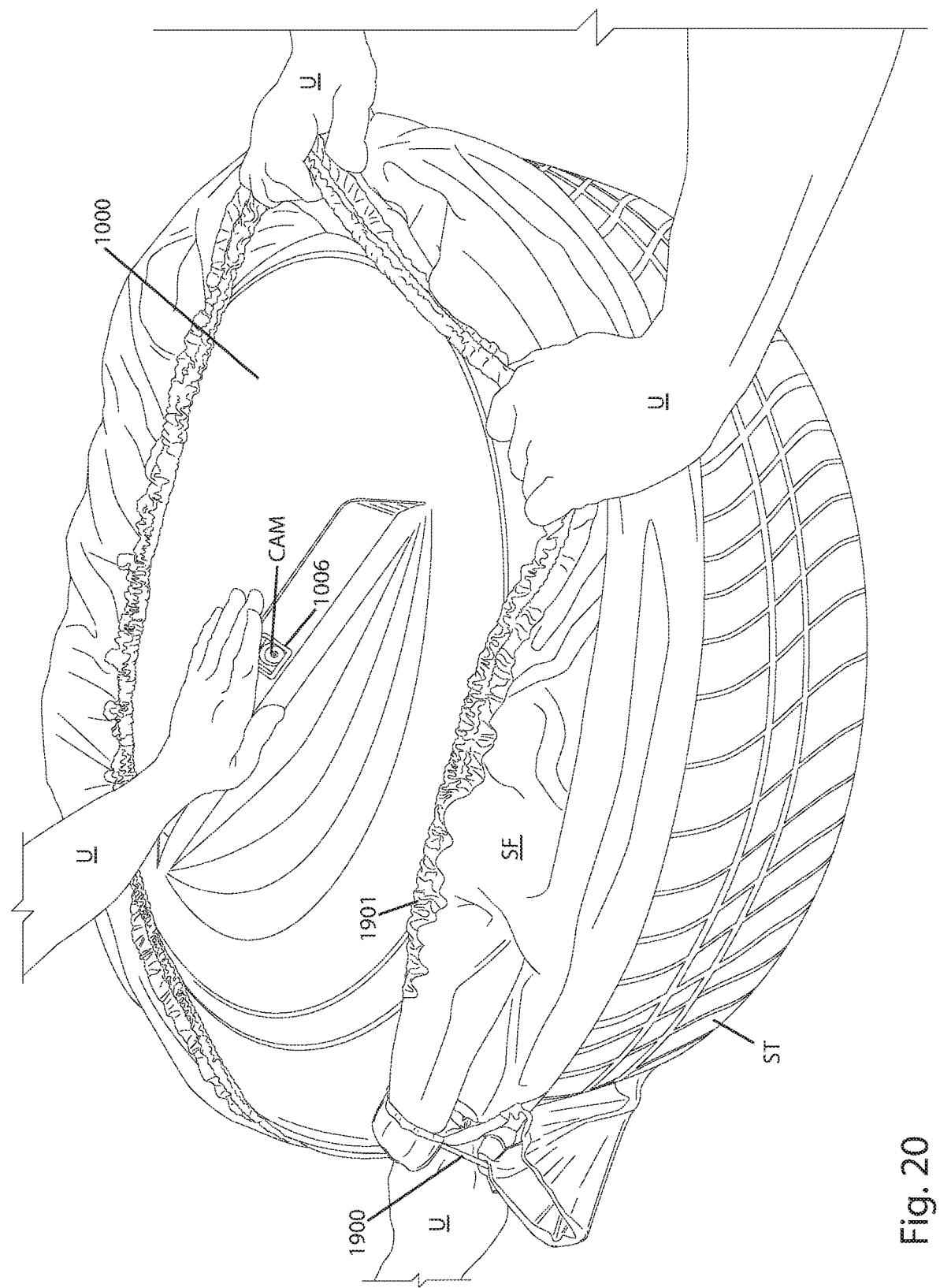
FIG. 20 is a front perspective view of an installation of a hard cover having a sewn on soft wrap.
Figure 21:
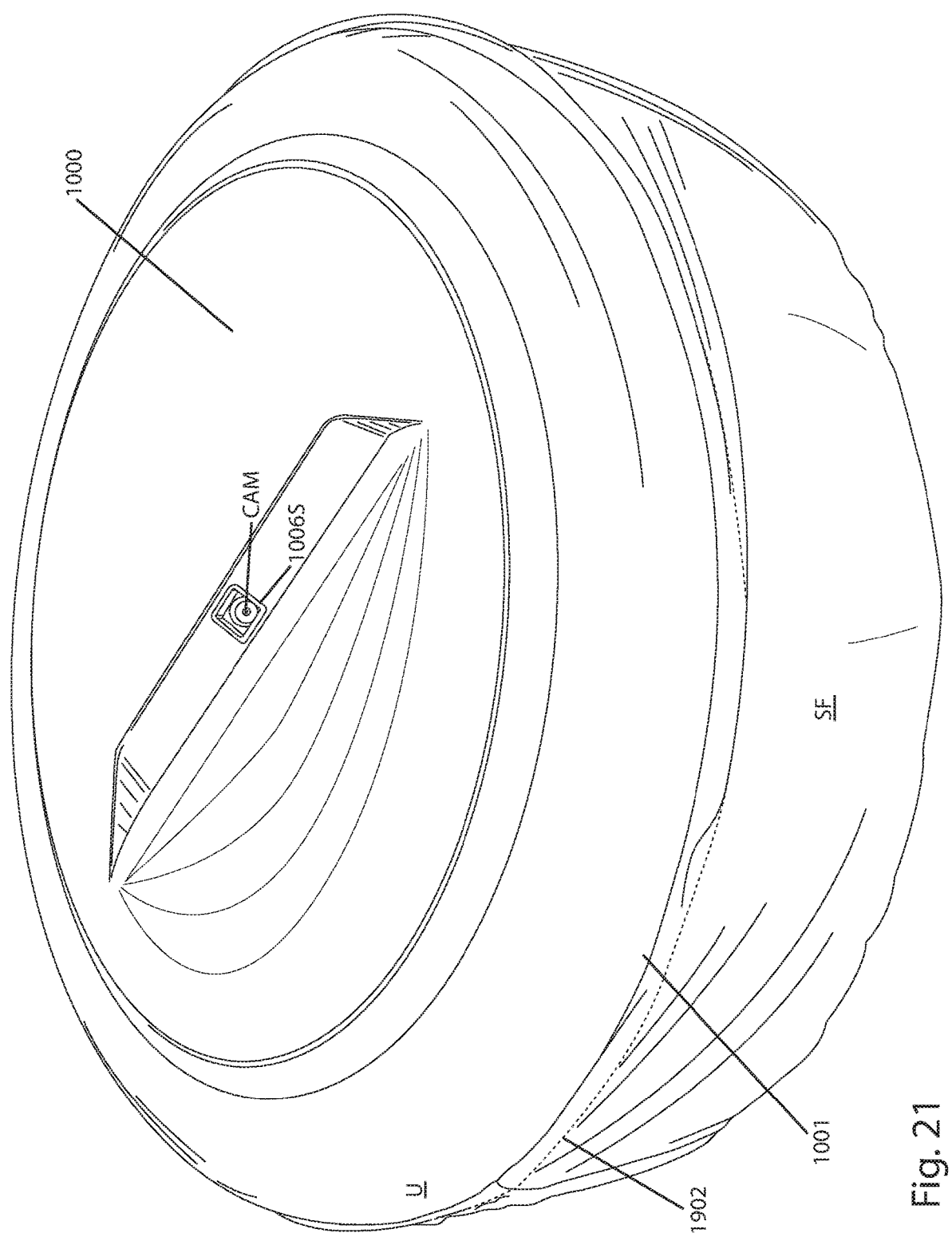
FIG. 21 is a front perspective view of the completed installation shown in FIG. 20.

Referring next to FIGS. 20,21 the hard cover 1000 can be installed onto the spare tire ST using a sewn on soft rim SF. The soft rim SF is preferably a non-woven polyester backed vinyl to prevent tire oils from seeping through. The user U first places the hard cover 1000 over the spare tire ST and camera CAM. Then the soft cover SF is pulled over the spare tire ST. An elastic band 1950 is sewn into a circular pocket 1901 of the soft rim Sf. Stitches 1902 are used to sew the soft rim SF to the lip 1001 of the hard cover 1000. The camera window 1006 is shown to have a soft rubber frame 1006S.

In FIG. 22 a hard cover assembly 2200 consists of a hard cover 1000 with an optional inner cover 2201. The optional soft inner cover 2201 is used to protect any painted surface on the inside back of the hard cover 1000. The lock loops 2202 are sewn into the soft rim SF.

After the soft rim SF is installed, the lock loops receive a cable 2203, as shown by arrow PT1, that is then inserted through the wheel W, as shown by arrow PT2. Then the cable 2203 is locked with lock 2204.

While a number of exemplifying features and embodiments have been discussed above, those of skill in the art will recognize certain modifications, permutations, additions and subcombinations thereof. No limitation with respect to the specific embodiments disclosed herein is intended or should be inferred.

What is claimed is:

1. A protection system for a camera that is mounted to extend through a center of a rear mounted spare tire on a vehicle, the protection system comprising:
   a front hood sized to fit around a front face of the camera;
   the front hood having a camera window;
   the front hood having an awning extending outbound over a top of the camera;
   a separable cylindrical base sized to fit around a base of the camera;
   at least one fastener removably connecting the separable cylindrical base from the front hood;
   an intervening member fastened between the front hood and the separable cylindrical base; and
   a brake light secured between the front hood and a rear base on top of a soft tire cover.

2. The protection system of claim 1, wherein the separable cylindrical base further comprises a spring catch to engage the camera.

3. The protection system of claim 1, wherein the fastener further comprises a boss in the separable cylindrical base with a hole and a screw therethrough connecting into the front hood.

4. The protection system of claim 1, wherein the soft cover having a pair of locking straps and a cable with a lock.

5. The protection system of claim 1, wherein the intervening member further comprises a washer.

6. The protection system of claim 5, wherein the washer is affixed between the soft tire cover and the separable cylindrical base.

7. An improvement to a rear tire mounted on a rear of a vehicle, wherein a backup camera protrudes from a center of the rear tire from a mount, the improvement comprising:
   a soft tire cover mounted over the spare tire and having a center hole for the backup camera to extend therethrough;
   a front hood mounted around the camera on top of the tire cover and having a camera window;
   the front hood having an awning projecting outbound over the camera;
   a rear base mounted around the camera behind the tire cover;
   at least one fastener hood;
   wherein the at least one fastener connecting the rear base to the front hood comprises a boss in the rear base with a hole and a screw therethrough connecting into the front hood; and
   a brake light secured between the front hood and the rear base on top of the soft cover.

8. The improvement of claim 7 further comprising a washer fitted under the front hood and on top of the rear base.

9. The improvement of claim 8 further comprising an ornament secured on top of the tire cover under the front hood.

10. The improvement of claim 8, wherein the rear base further comprises a clip to engage the camera.

11. The improvement of claim 7, wherein the soft cover further comprises a pair of locking straps, a cable and a lock.

12. The improvement of claim 7, wherein the rear base further comprises a spring clip fastener to engage the camera.

13. The improvement of claim 7 further comprising an ornament secured between the front hood and the rear base on top of the soft cover.

14. The improvement of claim 7 further comprising a washer secured under the front hood and behind the soft cover.

\* \* \* \* \*